United States Patent
Van Lare et al.

[15] 3,655,393
[45] Apr. 11, 1972

[54] PHOTOGRAPHIC EMULSION CONTAINING TERTIARY AMINO ALKYL SUBSTITUTED RHODANINE AND THIOBARBITURIC ACID MEROCYANINE DYE

[72] Inventors: Earl J. Van Lare; Arthur Fumia, Jr., both of Rochester, N.Y.

[73] Assignee: Eastman Kodak Company, Rochester, N.Y.

[22] Filed: June 16, 1969

[21] Appl. No.: 833,748

[52] U.S. Cl..................................96/140, 96/139
[51] Int. Cl...........................................G03c 1/08
[58] Field of Search....................96/102, 139, 140

[56] References Cited

UNITED STATES PATENTS 3,384,483   5/1968   Taber et al..............................96/105

FOREIGN PATENTS OR APPLICATIONS 1,460,985   12/1965   France

*Primary Examiner*—Norman G. Torchin
*Assistant Examiner*—John L. Goodrow
*Attorney*—W. H. J. Kline, J. R. Frederick and O. H. Webster

[57] ABSTRACT

Novel merocyanine dyes are provided which feature first and second nuclei joined by a double bond, a dimethine, a tetramethine or hexamethine linkage, the first nucleus being a rhodanine nucleus or 2-thiobarbituric acid nucleus joined at the five-carbon atom thereof to said linkage; and, the other nucleus being a five- to six-membered nitrogen-containing heterocyclic basic nucleus of the type used in merocyanine dyes joined at a carbon atom thereof to said linkage, said heterocyclic nitrogen atom of said nucleus having attached thereto a tertiary aminoalkyl group.

6 Claims, No Drawings

PHOTOGRAPHIC EMULSION CONTAINING TERTIARY AMINO ALKYL SUBSTITUTED RHODANINE AND THIOBARBITURIC ACID MEROCYANINE DYE

This invention relates to novel dyes and photographic materials. More particularly it relates to certain merocyanine dyes and photographic silver halide emulsions spectrally sensitized with merocyanine dyes.

A merocyanine dye having an oxazolidone nucleus and substituted with a tertiary aminoalkyl group is described in Example 9 of French Pat. No. 1,460,985. This dye, and related dyes such as 4-{[5,6-dichloro-1-ethyl-3-(2-morpholinoethyl)-2-benzimidazolinylidene]ethylidene}-1,2-diphenyl-3,5-pyrazolidinedione, 5-{[5,6-dichloro-1-ethyl-3-(2-morpholinoethyl)-2-benzimidazolinylidene]ethylidene}-3-ethyl-2-thio-2,4-oxazolidinedione, 4-{[5,6-dichloro-1-ethyl-3-(2-morpholinoethyl)-2-benzimidazolinylidene]ethylidene}-3-phenyl-2-isoxazolin-5-one, and 4{[5,6-dichloro-1-ethyl-3-(2-morpholinoethyl)-2-benzimidazolinylidene]ethylidene}-3-methyl-1-phenyl-2-pyrazolin-5-one do not provide as high blue sensitivity as desired in emulsions in which they incorporated. Merocyanine dyes having a tertiary aminoalkyl group substituted on the heterocyclic nitrogen atom of the basic nucleus exhibit good solubility, are efficient spectral sensitizers and emulsions containing them exhibit better incubation stability then merocyanine dyes having a tertiary aminoalkyl group on the acidic nucleus, such as the dyes described by Taber et al., in U.S. Pat. No. 3,384,486 issued May 21, 1968. Accordingly, it would be highly desirable to provide merocyanine dyes having a tertiary aminoalkyl group substituted on the heterocyclic nitrogen atom of the basic nucleus, which dyes exhibit particularly good incubation stability, excellent spectral sensitization, a high degree of solubility in aqueous solvent solutions and are good "chemical" sensitizers, i.e., the dyes produce high sensitivity to blue radiation in photographic emulsions.

Accordingly, one object of this invention is to provide merocyanine dyes and photographic silver halide emulsions spectrally sensitized with merocyanine dyes.

Another object of this invention is to provide photographic silver halide emulsions containing merocyanine dyes, which emulsions exhibit good incubation stability and high sensitivity to blue radiation.

Another object of this invention is to provide merocyanine dyes which impart unexpected increases in blue sensitivity to photographic silver halide emulsions.

Still another object of this invention is to provide merocyanine dyes which feature a tertiary aminoalkyl group on the basic nucleus of the merocyanine dye.

Other objects of this invention will be apparent from the disclosure and the appended claims.

In one embodiment of this invention, merocyanine dyes are provided comprising first and second nuclei joined by a linkage selected from a double bond, a dimethine linkage, a tetramethine linkage and a hexamethine linkage; the first nucleus being selected from the group consisting of a rhodanine nucleus joined at the five-carbon atom thereof to said linkage, and a 2- thiobarbituric acid nucleus joined at the five-carbon atom thereof to said linkage; and, the second nucleus being a nitrogen-containing basic heterocyclic nucleus of the type used in merocyanine dyes, said heter-nitrogen atom having attached thereto a tertiary aminoalkyl group.

As used herein, "tertiary aminoalkyl" refers to a group of the formula

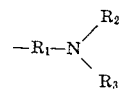

wherein R represents an alkylene group, which is attached to the heterocyclic nitrogen atom of the basic nucleus, and $R_2$ and $R_3$ each represents a substituent, such as alkyl, aryl or, $R_2$ and $R_3$ are taken together to represent the atoms required to complete a heterocyclic nucleus.

In another embodiment of this invention, merocyanine dyes are provided comprising first and second nuclei joined by a dimethine linkage, said first nucleus being selected from the group consisting of a rhodanine nucleus joined at the five-carbon atom thereof to said linkage and a 2-thiobarbituric acid nucleus joined at the five-carbon atom thereof to said linkage; and, said second nucleus being a benzimidazole nucleus joined at the two-carbon atom thereof to said linkage, said benzimidazole nucleus having substituted on a heterocyclic nitrogen atom thereof a tertiary aminoalkyl group.

Highly useful merocyanine dyes in accordance with this invention have the following formula:

I.

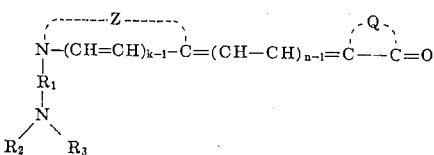

wherein $n$ represents an integer of from one to four; $k$ represents an integer of from one to two; Z represents the non-metallic atoms required to complete a five- to six-membered nitrogen-containing basic heterocyclic nucleus of the type used in merocyanine dyes, which nucleus can contain a second hetero atom such as oxygen, sulfur, selenium or nitrogen, such as the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]-thiazole, naphtho[1,2-d]thiazole, 5-methoxynaphtho[2,3-d]-thiazole, 5-ethoxynaphtho[1,2d]thiazole, 8-methoxynaphtho-[1,2-d]thiazole, 7-methoxynaphtho[1,2-d]thiazole, 4'-methoxy-thianapththeno-7', 6', 4,5-thiazole, etc; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, naphtho[1,2-d]oxazole, naphtho[1,2-d] oxazole, etc; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc; a thiazoline nucleus, e.g., thiazoline, 4-methylthiazoline, etc; a pyridine nucleus, e.g., 2-pyridine, 5-methyl-2-pyridine, 4-pyridine, 3-methyl-4-pyridine, etc; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, 1-isoquinoline, 3,4-dihydro-1-isoquinoline, 3-isoquinoline, etc; a 3,3-dialkylindolenine nucleus, e.g., 3,3-dimethylindolenine, 3,3,5-trimethylindolenine, etc; and, an imidazole nucleus, e.g., imidazole, 1-alkylimidazole, 1-alkyl-4-phenylimidazole, 1-alkyl-4,5-di-methylimidazole, benzimidazole, 1-alkyl-benzimidazole, 1-aryl-5,6-dichlorobenzimidazole, 1-alkyl-1H-naphtho[1,2-d]imidazole, 1-aryl-3H-naphtho[1,2d]imidazole, 1-alkyl-5-methoxy-1H-naphtho[1,2-d]imidazole, etc; $R_1$ represents an alkylene group containing from 2 to 6 carbon atoms, such as ethylene, n-propylene, iso-propylene, n-butylene, iso-butylene, n-pentylene, 2-ethylpropylene, iso-hexylene, 2-ethylbutylene, etc, $R_1$ preferably containing from one to four carbon atoms; $R_2$ and $R_3$ taken separately represent a member selected from the group consisting of an alkyl group containing from two to 12 carbon atoms, such as ethyl, n-propyl, iso-propyl, n-butyl, iso-butyl, n-pentyl, n-hexyl, 3-ethylbutyl, n-octyl, n-dodecylbenzyl, phenylethyl, etc, the alkyl group preferably containing from one to four carbon atoms, or an aryl group such as phenyl, tolyl, naphthyl, methoxyphenyl, chlorophenyl, etc, or taken together, $R_2$ and $R_3$ represent the atoms required to complete, with the nitrogen atom to which they are attached, a heterocyclic nucleus containing from four to five atoms, such as morpholine, thiomorpholine, piperidine, pyrrolidine, 4-alkylpiperazine such as 4-methylpiperazine, decahydroquinoline or tetrahydroquinoline; and, Q represents the atoms required to complete a nucleus selected from the group consisting of a rhodanine nucleus and a 2-thiobarbituric acid nucleus, said nucleus being joined at the five-carbon atom thereof to the methine linkage of said dye, especially useful nuclei being the 3-alkylrhodanine and 1,3-dialkylthiobarbituric acid nuclei wherein the alkyl groups contain from one to four carbon atoms, such as methyl, ethyl, propyl or butyl groups. Especially useful are dyes of the above formula wherein $n$ represents two; $k$ represents one; Z represents the atoms required to complete a benzimidazole nucleus, and preferably a 5-chloro or a 5,6-di-chlorobenzimidazole nucleus; Q represents the atoms required to complete a nucleus selected from the group consisting of a rhodanine nucleus and a 2-thiobarbituric acid nucleus; $R_1$ represents an alkylene group containing from two to three carbon atoms; and, $R_2$ and $R_3$ each represents an alkyl group containing from one to four carbon atoms.

In still another embodiment of this invention, light-sensitive photographic silver halide emulsions are provided which contain the merocyanine dyes of this invention. Photographic silver halide emulsions containing the merocyanine dyes described herein exhibit good stability on incubation at high temperatures and high humidity, and demonstrate good sensitivity to blue radiation as well as good sensitivity in the spectrally sensitized region.

Typical useful merocyanine dyes in accordance with this invention are listed below.

3-ethyl-5-{[1-ethyl-3-(2-morpholinoethyl)-2-benzimidazolinylidene]ethylidene}rhodanine ethylidene 3-ethyl-5-{[1-ethyl-5-methyl-3-(2-morpholinoethyl)-2-benzimidazolinylidene]ethylidene}rhodanine 5-{[5-chloro-1-ethyl-3-(2-morpholinoethyl)-2-benzimidazolinydene]ethylidene}-3-ethylrhodanine 5-{[5,6-dichloro-1-ethyl-3-(2-piperidinoethyl)-2-benzimidazolinylidene]ethylidene}-3-ethylrhodanine 5-{[5,6-dichloro-1-ethyl-3-(2-morphplinoethyl)2-benzimidazolinylidene]ethylidene}-3-ethylrhodanine 5-{4-[5,6-dichloro-1-ethyl-3-(2-morpholinoethyl)2-benzimidazolinylidene]-2-butenylidene}-3-ethylrhodanine 5-{[5,6-dichloro-1-ethyl-3-(2-morpholinoethyl)-2-benzimidazolinylidene]ethylidene}-1,3-diethyl-2-thiobarbituric acid 5-[{5,6-dichloro-1-ethyl-3-[2-(1-pyrrolidinyl)ethyl]-2-benzimidazolinylidene}ethylidene]-3-ethylrhodanine 5-[{5,6-dichloro-1-ethyl-3-[2-(3-pyrrolin-1-yl)ethyl]-2-benzimidazolinylidene}ethylidene]-3-ethylrhodanine 5-{[5,6-dichloro-1-(2-dimethylaminoethyl)-3-ethyl-2-benzimidazolinylidene]ethylidene}-3-ethylrhodanine 5-{[5,6-dichloro-1-(2-diethylaminoethyl)-3-ethyl-2-benzimidazolinylidene]ethylidene}-3-ethylrhodanine 5-{[5,6-dichloro-1-(2-diethylaminoethyl)-3-ethyl-2-benzimidazolinylidene]ethylidene}-1,3-diethyl-2-thiobarbituric acid 5-{[5,6-dichloro-1-(3-dimethylaminopropyl)-3-ethyl-2-benzimidazolinylidene]ethylidene}-3-ethylrhodanine 5-{[5,6-dichloro-1-[(2-dimethylamino-1-methyl)ethyl]-3-ethyl-2-benzimidazolinylidene]ethylidene}-3-ethylrhodanine 5-{6-[5,6-dichloro-1-ethyl-3-(2-morpholinoethyl)-2-benzimidazolinylidene]-2,4-hexatriene}-3-ethylrhodanine 5-[5,6-dichloro-1-ethyl-3-(2-morpholinoethyl)-2-benzimidazolinylidene]-3-ethylrhodanine 5-{4-[5,6-dichloro-1-ethyl-3-(2-thiomorpholinoethyl)-2-benzimidazolinylidene]-2-butenylidene}-3-ethylrhodanine 5-{[5,6-dichloro-1-ethyl-3-(2-piperidinoethyl)-2-benzimidazolinylidene]ethylidene}1,3-diethyl-2-thiobarbituric acid 5-{4-{3-[2-(1-pyrrolinyl)butyl]-2-benzothiazolinylidene}-2-butenylidene}-3-propylrhodanine 5-{{3-[2-(4-methyl-1-pyrazinyl)ethyl]-2-benzoselenazolinylidene}ethylidene}-1,3-diethyl-2-thiobarbituric acid 5-{6-{3-[2-(1-decahydroquinolyl)ethyl]-2-benzoxazolinylidene}-2,4-hexadienylidene}-1,3-diethyl-2-thiobarbituric acid 3-ethyl-5-{{1-ethyl-3-[4-(1-tetrahydroquinolyl)butyl]-2-benzimidazolinylidene}ethylidene}rhodanine The dyes of this invention can be prepared by reacting (1) a heterocyclic quaternary ammonium salt, substituted on the heterocyclic nitrogen atom with a tertiary aminoalkyl salt group, with (2) an acidic intermediate of the type used in the preparation of merocyanine dyes in the presence of (3) a basic condensing agent, such as a trialkylamine, e.g., trimethylamine or tributylamine, a dialkylaniline such as N,N-dimethylaniline, or a heterocyclic tertiary amine such as pyridine, N-ethyl-piperidine, etc. The condensation can be conducted in a suitable diluent, such dimethylformamide, methanol, dimethylformaide, 1,4-dioxane, etc. Reaction preferably is conducted at reflux and is generally complete in about 5 to 20 minutes.

Dyes of Formula I where $n$ represents one are prepared by condensing a compound of the formula:

II. 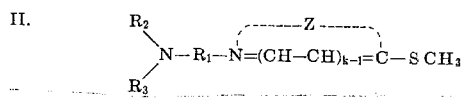

wherein $R_1$, $R_2$, $R_3$, $k$ and Z have the meanings given above, with a compound having the following formula:

III. 

wherein Q has the meaning given above, in the presence of a basic condensing agent.

Dyes of Formula I wherein $n$ represents two, three or four are prepared by condensing a compound having the formula:

IV. 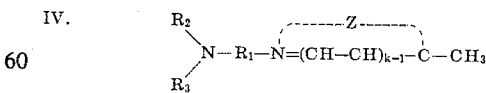

wherein $R_1$, $R_2$, $R_3$, $k$ and Z have the meanings given above, with a compound having the formula:

V. 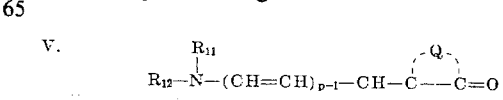

wherein $R_{12}$ represents phenyl; $R_{11}$ represents hydrogen or acetyl and $p$ represents two, three or four.

Intermediates of Formulas II and IV are prepared from heterocyclic ammonium bases of the types used in the preparation of merocyanine dyes, with an alkylating agent having the following formula:

VI. 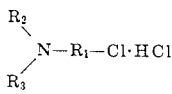

wherein $R_1$, $R_2$ and $R_3$ have the meanings given above.

In the preparation of negative silver halide photographic emulsions, the dyes of the invention are advantageously incorporated in the washed, finished silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc, alone or in admixtures, have proven satisfactory as solvents for this purpose. The type of silver halide emulsions that can be sensitized with the dyes of the invention include any of those prepared with hydrophilic colloids that are known to be satisfactory for dispersing silver halides, for example, emulsions comprising natural materials such as gelatin, albumin, agar-agar, gum arabic, alginic acid, etc, and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pat. Nos. 3,142,568; 3,193,386; 3,062,674 and 3,220,844 and include the water insoluble polymers of alkyl acrylates and methacrylates, acrylic acid, sulfoalkyl acrylates or methacrylates and the like.

The types of silver halide emulsions that can be sensitized with the new dyes of this invention include any of the conventional emulsions prepared with light-sensitive silver salts including silver chloride, silver bromide, silver iodide, silver chlorobromide, silver bromoiodide, silver chlorobromoiodide, etc. The concentration of the new dyes in the emulsion can vary widely, e.g., from about 5 to about 100 mg. per liter of flowable emulsion. The specific concentration will vary according to the type of light-sensitive material in the emulsion and the effects desired. The suitable and most economical concentration for a given emulsion will be apparent to those skilled in the art upon making the tests and observations customarily used in the art of emulsion making.

To prepare a gelatin-silver halide emulsion sensitized with one of the dyes of this invention, the following procedure is satisfactory. A quantity of the dye is dissolved in a suitable solvent and a volume of this solution containing from 5 to 100 mg. of dye is slowly added to about one liter of a gelatin-silver halide emulsion. With most of the dyes, about from 5 to 20 mg. of dye per liter of emulsion suffices to produce the maximum sensitizing effect with the ordinary gelatin-silver bromide (including bromoiodide and chlorobromide) emulsions. With fine-grain emulsions, which include most of the ordinarily employed gelatin-silver chloride emulsions, somewhat larger concentrations of dye may be necessary to obtain the optimum sensitizing effect. While this procedure has dealt with emulsions comprising gelatin, it will be understood that these remarks apply generally to any emulsions wherein part of all of the gelatin is substituted by another suitable hydrophilic colloid, such as previously mentioned. It will also be understood that the above description is intended to be illustrative and should not be construed as limiting out invention in any sense since it is apparent that the new dyes can be incorporated by other methods in many of the photographic silver halide emulsions and hydrophilic colloid layers customarily employed in the art. For instance, the dyes can be incorporated by bathing a plate or film bearing an emulsion layer in a solution of one of the dyes in an appropriate solvent.

The following examples are included for a further understanding of this invention. All temperatures are given in ° C.

EXAMPLE 1

3-Ethyl-5-{[1-ethyl-3-(2-morpholinoethyl)-2-benzimidazolinylidene]ethylidene}rhodanine

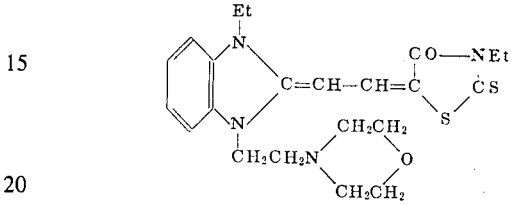

A mixture of 1.7 g. of 1-ethyl-2-methyl-3-(2-morpholinoethyl)benzimidazolium chloride hydrochloride; 1.6 g. of 5-acetanilidomethylene-3-ethyl rhodanine; 10 ml. of pyridine and 1.2 g. of tetramethylguanidine is refluxed 20 minutes. After cooling, the reaction mixture is extracted with four 200 ml. portions of ether and the extracts combined and concentrated to dryness. The solid is stirred with water and then collected on a filter and twice recrystallized from ethanol. A yield of 0.3 g. (13%) of purified dye is obtained as reddish crystals, m.p. 168°–169° dec.

EXAMPLE 2

3-Ethyl-5-{[1-ethyl-5-methyl-3-(2-morpholinoethyl)-2-benzimidazolinylidene]ethylidene}rhodanine

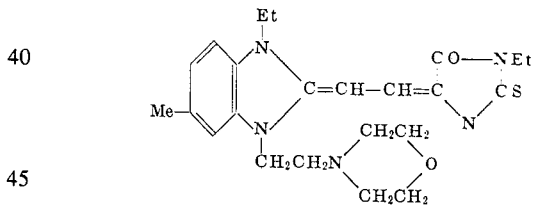

A mixture of 1.8 g. of 1-ethyl-2,5-dimethyl-3-(2-morpholinoethyl)benzimidazolium chloride hydrochloride; 1.6 of 5-acetanilidomethylene-3-ethylrhodanine;10 ml. of pyridine and 1.2 g. of tetramethylguanidine is refluxed 20 minutes. After cooling, the reaction mixture is extracted with four 250 ml. portions of ether, the ether extracts combined and the ether removed. The residue is triturated with a small amount of ethanol and chilled. The solid is collected on a filter, washed with ethanol and twice recrystallized from ethanol. A yield of 0.25 g. (11%) of purified dye is obtained as red crystals, m.p. 190°–191° dec.

EXAMPLE 3

5-{[5-Chloro-1-ethyl-3-(2-morpholinoethyl)-2-benzimidazolinylidene]ethylidene}-3-ethylrhodanine a filter, washed from methanol. The ml. dec.

A mixture of 1.9 g. of 5-chloro-1-ethyl-2-methyl-3-(2-morpholinoethyl)benzimidazolium chloride hydrochloride; 1.6 g. of 5-acetanilidomethylene-3-ethylrhodanine; 10 ml. of pyridine and 1.2 g. of tetramethylquanidine is refluxed 20 minutes. After cooling, the reaction mixture is treated with water. After chilling, the solid is collected on a filter washed with water, and twice recrystallized from methanol, The dye is extracted six times with 100 mo. of ether and the solid collected on a filter. A yield of 0.25 g. (10%) of purified dye is obtained as purplish crystals with a bright reflex, m.p. 202°–204° Dec.

EXAMPLE 4

5-{[5,6-Dichloro-1-ethyl-3-(2-piperidinoethyl)-2-benzimidazolinylidene]ethylidene}-3-ethylrhodanine

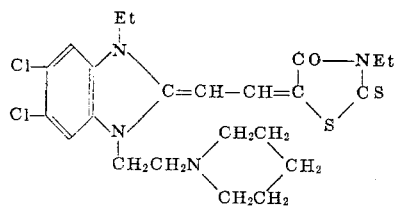

A mixture of 2 g. of 5,6-dichloro-1-ethyl-2-methyl-3-(2-piperidinoethyl)benzimidazolium chloride hydrochloride; 1.6 g. of 5-acetanilidomethylene-3-ethylrhodanine; 15 ml. of dimethylacetamide and 1 g. of triethylamine is heated at 120–130°for 2 minutes. After cooling, the reaction mixture is treated with water and the water decanted from an oily layer which is stirred with a small amount of ethanol. After chilling, the solid is collected on a filter, dissolved in pyridine and precipitated with ethanol. A yield of 0.6 g. (23%) of purified dye is obtained as red crystals with a golden reflex m.p. 278°–280° dec.

Anal. Calculated for $C_{23}H_{28}Cl_2N_4OS_2$: C, 54.0; H, 5.5; N, 11.0

Found: C, 53.7; H, 5.3; N, 10.7.

EXAMPLE 5

5-{[5,6-Dichloro-1-ethyl-3-(2-morpholinoethyl)-2-benzimidazolinylidene]ethylidene}-3-ethylrhodanine A mixture of 2.1 g. of 5,6-dichloro-1-ethyl-2-methyl-3-(2-morpholinoethyl)benzimidazolium chloride hydrochloride; 1.6 g. of 5-acetanilidomethyl-3-ethylrhodanine; 10 ml. of pyridine and 1.2 g of tetramethylguanidine is refluxed 10 minutes. After cooling, the reaction mixture is diluted with 20 ml. of water and the mixture chilled. The solid is collected on a filter, washed with water and dissolved in pyridine and precipitated with ethanol. A yield of 0.8 g. (31%) of purified dye is obtained as red crystals, m.p. 195° – 197° dec.

EXAMPLE 6

5-{4-[5,6-Dichloro-1-ethyl-3-(2-morpholinoethyl)-2-benzimidazolinylidene]-2-butenylidene}-3-ethylrhodanine

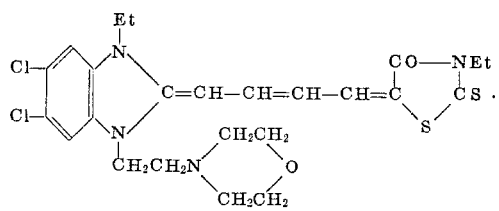

A mixture of 2.1 g. of 5,6-dichloro-1-ethyl-2-methyl-3-(2-morpholinoethyl)benzimidazolium chloride hydrochloride; 1.7 g. of 5-acetanilidoallylidene-3-ethylrhodanine; 10 ml. of pyridine and 1.2 g. of tetramethylguanidine is refluxed 15 minutes. After cooling, the reaction mixture is treated with ether and the ether layer decanted from an oily layer which is washed with ether, washed with water and then dissolved in ethanol. After chilling, the solid is collected on a filter, washed with ethanol and dissolved in pyridine and precipitated with ether. A yield of 1.1 g. (40%) of purified dye is obtained as dark blue crystals, m.p. 251°–252° dec. Relayed dyes are prepared by replacing the 5-acetanilido-allylidene-3-ethyl rhodanine of this example with a similar quantity of 5-acetanilido-2,4-pentadienylidene to obtain the dye 5-{6-[5,6-dichloro-1-ethyl-3-(2-morpholinoethyl)-2-benzimidazoliny- lidene]-2,4-hexadionylidene}-3-ethylrhodanine. Also, when the benzimidazolium salt in the above example is replaced with 5,6-dichloro-1-ethyl-2-methylthio-3-(2-morpholinoethyl)benzimidazolium chloride hydrochloride, there is obtained the dye 5-[5,6-dichloro-1-ethyl-3-(2-morpholinoethyl)-2-benzimidazolinylidene]-3-ethylrhodanine.

EXAMPLE 7

5-{[5,6-Dichloro-1-ethyl-3-(2-morpholinoethyl)-2-benzimidazolinylidene]ethylidene}-1,3-diethyl-2-thiobarbituric acid

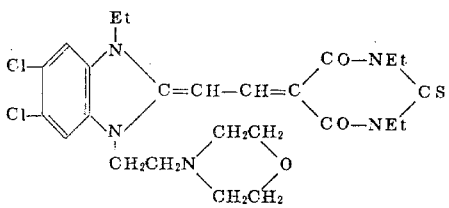

A mixture of 2.1 g. of 5,6-dichloro-1-ethyl-2-methyl-3-(2-morpholinoethyl)benzimidazolium chloride hydrochloride; 1.6 g. of 5-acetanilidomethylene-1,3-diethyl-2-thiobarbituric acid; 10 ml. of pyridine; 0.5 g. of acetic anhydride and 1.8 g. of tetraethylguanidine is refluxed 10 minutes. After cooling, the reaction mixture is diluted with 30 ml. of water and chilled. The solid is collected on a filter, washed with water and recrystallized from ethanol. The solid is recrystallized again from ethanol and after cooling to room temperature, the reddish crystals are collected on a filter and recrystallized again from ethanol. A yield of 0.35 g. (13%) of purified dye is obtained as yellowish crystals, m.p. 247°–248° dec.

EXAMPLE 8

5-[{5,6-Dichloro-1-ethyl-3-[2-(1-pyrrolidinyl)ethyl]-2-benzimidazolinylidene}ethylidene]-3-ethylrhodanine A mixture of 2 g. of 5,6-dichloro-1-ethyl-23-[2-(1-pyrrolidinyl)ethyl]benzimidazolium chloride hydrochloride; 1.6 g. of 5-acetanilodomethylene-3-ethylrhodanine; 10 ml. of pyridine and 1.2 g. of tetramethylguanidine is refluxed 15 minutes. After cooling, the reaction mixture is treated with water, stirred and chilled. The solid is collected on a filter, washed with water and dissolved in pyridine and precipitated with ethanol. A yield of 1.2 g. (48%) of purified dye is obtained as red needles with a green reflex, m.p. 151°–152° dec.

EXAMPLE 9

5-[{5,6-Dichloro-1-ethyl-3-[2-(3-pyrrolin-1-yl)ethyl]-2-benzimidazolinylidene}ethylidene]-3-ethylrhodanine

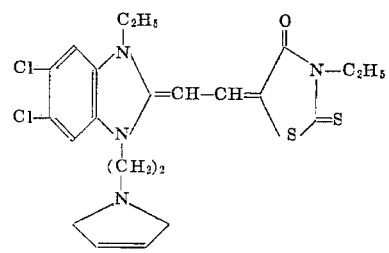

5,6-Dichloro-1-ethyl-2-methyl-3-[2-(3-pyrrolin-1-yl)ethyl]benzimidazolium perchlorate hydroperchlorate (2.6 g.), 5-acetanilidomethylene-3-ethylrhodanine (1.5 g.), and 1,1,3,3-tetramethylguanidine (1.2 g.) are dissolved in N,N-dimethylacetamide (15 ml.) and heated at a gentle reflux for 5 minutes. After cooling, the mixture is diluted with water (300 ml.) and the mixture stirred and scratched to form crystals. The solid is collected on filter and then boiled with methanol (50 ml.). After chilling, the crude dye is collected on a filter and after one recrystallization from pyridine/methanol, the yield of purified dye is 0.6 g. (24%), m.p. 187°–188° C. dec.

EXAMPLE 10

5-{[5,6-Dichloro-1-(2-dimethylaminoethyl)-3-ethyl-2-benzimidazolinylidene]ethylidene}-3-ethylrhodanine A mixture of 1.9 g. of 5,6-dichloro-1-(2-dimethylaminoethyl)-1-ethyl-2-methylbenzimidazolium chloride hydrochloride, 1.6 g. of 5-acetanilidomethylene-3-ethylrhodanine, 10 ml. of pyridine and 1 g. of triethylamine is refluxed 30 minutes. The reaction mixture is poured into 150 ml. of water, and the oil which separates washed with water and triturated with ethanol. After chilling, the solid is collected on a filter, washed with ethanol and dissolved in pyridine and precipitated with methanol. A yield of 0.2 g. (8%) of purified dye is obtained as red crystals m.p. 291°–293° dec.

EXAMPLE 11

5-{[5,6-Dichloro-1-(2-diethylaminoethyl)-3-ethyl-2-benzimidazolinylidene]ethylidene}-3-ethylrhodanine

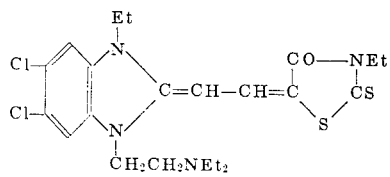

A mixture of 4 g. of 5,6-dichloro-1-(2-diethylaminoethyl)-3-ethyl-2-methylbenzimidazolium chloride hydrochloride; 3.2 g. of 5-acetanilidomethylene-3-ethylrhodanine; 20 ml. of pyridine and 2 g. of triethylamine is refluxed 15 minutes. After chilling, the solid is collected on a filter, washed with ethanol and then with water and dissolved in pyridine and precipitated with methanol. A yield of 2.9 g. (58%) of purified dye is obtained as red crystals, m.p. 184°–185° dec.

Anal. Calculated for $C_{22}H_{28}Cl_2N_4OS_2$: C, 52.9; H, 5.7
Found: C, 53.1; H, 5.9

EXAMPLE 12

5-{[5,6-Dichloro-1-(2-diethylaminoethyl)-3-ethyl-2-benzimidazolinylidene]ethylidene}-1,3-diethyl-2-thiobarbituric acid A mixture of 2 g. of 5,6-dichloro-1-(2-diethylaminoethyl)-3-ethyl-2-methylbenzimidazolium chloride hydrochloride; 1.5 g. of 5-anilinomethylene-1,3-diethyl-2-thiobarbituric acid; 10 ml. of pyridine; 2 g. of triethylamine and 0.5 g. of acetic anhydride is refluxed 30 minutes. The chilled reaction mixture is filtered and the solid washed with a small amount of ethanol. The filtrate is treated with water and the water layer decanted from the oily layer which is washed with water and dissolved in benzene. The benzene layer is separated from a small amount of water and concentrated to 10 ml. to which 100 ml. of ligroin is added. After chilling, the solid is collected on a filter, washed with ligroin and recrystallized from benzene and ligroin. A yield of 0.1 g. (3%) of purified dye is obtained as brown crystals, m.p. 183°–185°.

EXAMPLE 13

5-{[5,6-Dichloro-1-(3-dimethylaminopropyl)-3-ethyl-2-benzimidazolinylidene]ethylidene}-3-ethylrhodanine A mixture of 1.9 g. of 5,6-dichloro-1-(3-dimethylaminopropyl)-1-ethyl-2-methylbenzimidazolium chloride hydrochloride; 1.6 g. of 5-acetanilidomethyl-3-ethylrhodanine; 10 ml. of dimethylacetamide and 1 g. of triethylamine is heated with stirring at 160°–180° for 10 minutes and then diluted with 100 ml. of water. The solid is collected on a filter, washed with water and triturated with ethanol. After chilling the solid is collected on a filter, dissolved in pyridine and precipitated with ethanol. A yield of 0.1 g. (9%) of purified dye is obtained as red crystals, m.p. 287°–289° dec.

EXAMPLE 14

5-{[5,6-Dichloro-1-[(2-dimethylamino-1-methyl)ethyl]-3-ethyl-2-benzimidazolinylidene]ethylidene}-3-ethylrhodanine

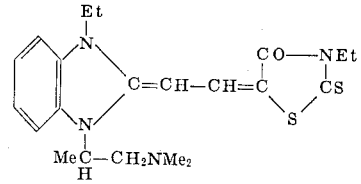

A mixture of 1.9 g. of 5,6-dichloro-1-[(2-dimethyl-amino-1-methyl)-ethyl]-3-ethyl-2-methylbenzimidazolium chloride hydrochloride; 1.6 g. of 5-acetanilidomethylene-3-ethylrhodanine; 10 ml. of pyridine and 1 g. of trimethylamine is refluxed 2 ½ hours. After cooling, the reaction mixture is treated with ether and the ether layer decanted from an oily layer which was washed with ether and stirred with a small amount of ethanol. After chilling, the solid is collected on a filter, washed with ethanol and dissolved in pyridine and precipitated with methanol. A yield of 0.1 g. (4%) of purified dye is obtained as red crystals, m.p. 298°–299° dec.

When the starting benzimidazolium salt intermediates of the foregoing Examples 1–14 are replaced with 1-β-diethylaminoethyl lepidinium iodide, hydroiodide; 3-β-diethylaminoethyl-2-methylbenzothiazolium iodide, hydroiodide or 3-diethylaminoethyl-2-methylbenzoxazolium iodide, hydroiodide or 3-β-diethylaminoethyl-2-methylbenzoselenazolium iodide, hydroiodide or 1-β-diethylaminoethyl-2,3,3-trimethylindolium iodide, hydroiodide, related spectral sensitizing dyes having generally similar properties are obtained.

The intermediates used in the preparation of the dyes of this invention can be prepared as described in the following examples:

EXAMPLE 15

1-β-Diethylaminoethyl lepidinium iodide, hydroiodide

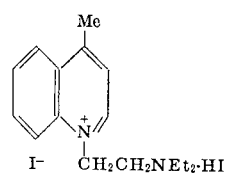

A mixture of 42.9 g. of lepidine, 34.4 g. of β-diethylaminoethyl chloride hydrochloride, and 33.2 g. of pulverized potassium iodide is heated at 135°–140° for 2 hours. The chilled melt is washed with ether and then extracted with 300 ml. of ethanol. The extract is filtered and the filtrate is treated with ether. The ether-alcohol liquors are decanted from a semi-solid residue, which is washed several times with ether and then filtered. A yield of 48 g. of hygroscopic solid is obtained after two weeks' drying in a vacuum desiccator over calcium chloride.

EXAMPLE 16

3-β-Diethylaminoethyl-2-methylbenzothiazolium iodide, hydroiodide

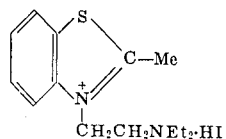

A mixture of 44.7 g. of 2-methylbenzothiazole, 34.4 g. of β-diethylaminoethyl chloride, hydrochloride, and 33.2 g. of powdered potassium iodide is heated at 135°–140° for 24 hours. The cooled reaction mixture is extracted with ethanol and extract filtered. The filtrate is treated with ether and the separated oil is washed several times with ether. The material is not obtained crystalline but is used directly to prepare dyes.

EXAMPLE 17

1Ethyl-2-methyl-3-(2-morpholinoethyl)benzimidazolium chloride, hydrochloride

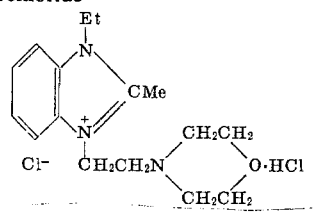

A mixture of 16 g. of 1-ethyl-2-methylbenzimidazole and 18.6 g. of N-2-chloroethylmorpholine hydrochloride is heated at 180°–190° for 1 hour. The mixture fused and then set to a cake. The cake is crushed in a mortar and the solid suspended in acetone. After standing for two hours, the solid is collected on a filter, washed with acetone and dried in a vacuum desiccator. A yield of 27.3 g. (78%) of colorless hygroscopic solid is obtained.

EXAMPLE 18

1-Ethyl-2,5-dimethyl-3-(2-morpholinoethyl)benzimidazolium chloride, hydrochloride

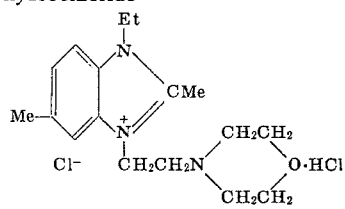

A mixture of 17.4 g. of 1-ethyl-2,5-dimethyl-benzimidazole and N-2-chloroethyl morpholine hydrochloride is heated at 180° for 1 hour. The mixture fused and then set to a cake. After cooling, the cake is boiled with 300 ml. of acetone for 7 hours. The product becomes crystalline and the solid is collected on a filter and washed with acetone and dried in a vacuum desiccator. A yield of 21 g. (58%) of colorless hygroscopic crystals is obtained.

EXAMPLE 19

5-Chloro-1-ethyl-2-methyl-3-(2-morphplinoethyl)benzimidazolium chloride, hydrochloride

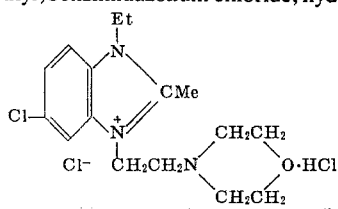

A mixture of 19.5 g. of 5-chloro-1-ethyl-2-methyl-benzimidazole and 18.6 g. of N-chloroethylmorpholine hydrochloride is heated at 180° for 1 hour. The mixture fused and then set to a glass on cooling. It is crushed in a mortar and then suspended in acetone. The sticky suspension is allowed to set 2 days and then the solid collected on a filter and washed with acetone. The very hygroscopic solid is dried in a vacuum desiccator. A yield of 29.3 g. (77%) of colorless solid is obtained.

EXAMPLE 20

5,6-Dichloro-1-ethyl-2-methyl-3-(2-piperidinoethyl)benzimidazolium chloride, hydrochloride

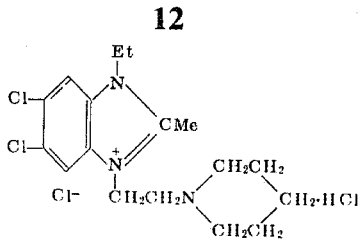

A mixture of 23 g. of 5,6-dichloro-1-ethyl-2-methyl-benzimidazole and 19 g. of 1-β-chloroethylpiperidine hydrochloride is heated at 180°–190° for 1 hour. The mixture becomes mushy and eventually fused. The cooled melt is crushed in a mortar. The hygroscopic solid is bottled quickly and used without further purification. A yield of 39 g. (90%) of colorless solid is obtained.

EXAMPLE 21

5,6-Dichloro-1-ethyl-2-methyl-3-(2-morpholinoethyl)benzimidazolium chloride, hydrochloride

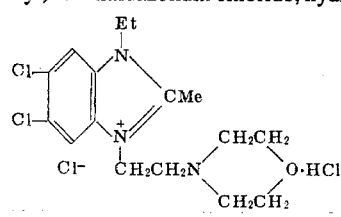

A mixture of 23 g. of 5,6-dichloro-1-ethyl-2-methyl-benzimidazole and 18.6 g. of N-chloroethylmorpholine hydrochloride is heated at 175°–185° for 30 minutes. The mixture fused and turned dark brown. The cooled melt is crushed in a mortar and suspended in acetone. The solid is collected on a filter, washed with acetone and dried in a vacuum desiccator. A yield of 38 g. (91%) of colorless hygroscopic product is obtained.

EXAMPLE 22

5,6-Dichloro-1-ethyl-2-methyl-3-[2-(1-pyrrolidinyl)ethyl]benzimidazolium chloride, hydrochloride

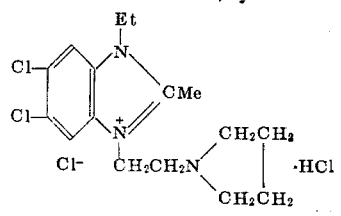

A mixture of 23 g. of 5,6-dichloro-1-ethyl-2-methyl-benzimidazole and 17 g. of 1-β-chloroethylpyrrolidine hydrochloride is heated at 190°–195° for 30 minutes. The mixture fused and turned dark brown. The cooled mixture is refluxed with three portions of acetone. The acetone chilled and the solid collected on a filter. The hygroscopic solid is dried in a vacuum desiccator. A yield of 15.3 g. (36%) of colorless solid is obtained.

EXAMPLE 23

5,6-Dichloro-1-ethyl-2-methyl-3-[2-(3-pyrrolin-1-yl)ethyl]-benzimidazolium perchlorate, hydroperchlorate

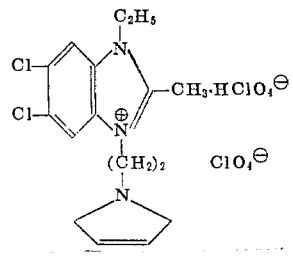

1-(2-Chloroethyl)-3-pyrroline hydrochloride (14.5 g.) and 5,6-dichloro-1-ethyl-2-methylbenzimidazole (19.8 g.) are heated together in an oil bath at 185°–190° C. for 20 minutes. After cooling, the cake is dissolved in boiling ethanol and the hot solution treated with an aqueous solution of sodium perchlorate (25.0 g.). After chilling, the solid is collected on a filter and dried. The yield is 17.0 g. (38%), m.p. >300° C. with darkening at 240° C.

1-(2-Chloroethyl)-3-pyrroline hydrochloride

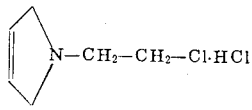

To a stirred, cooled solution of 1-(2-hydroxyethyl)-3-pyrroline (U.S. Pat. No. 2,593,853) (17.9 g.) in chloroform (100 ml.) is added thionyl chloride (14.3 ml.) dropwise with the temperature being held at 15°–20° during the addition After the addition is completed, the mixture is allowed to stir at room temperature for 3½ hours. The mixture is then evaporated to dryness under reduced pressure and the residue is dissolved in boiling ethanol. The hot solution is filtered and the cooled filtrate diluted with ethyl acetate to precipitate the product. After chilling, the solid is collected on a filter and then dried in a vacuum oven at 65° C. The yield is 14.5 g. (54%), m.p. 154°–155° C.

EXAMPLE 24

5,6-Dichloro-1-β-dimethylaminoethyl-3-ethyl-2-methyl benzimidazolium chloride, hydrochloride

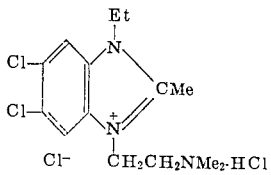

A mixture of 22.9 g. of 5,6-dichloro-1-ethyl-2-methyl benzimidazole and 14.4 g. β-dimethylaminoethyl chloride, hydrochloride is heated at 170°–190° for 40 minutes. The mixture slowly fused and eventually melted which set to a glass on cooling. The melt is boiled several times with acetone and finally became completely crystalline. The solid is collected on a filter and dried in a vacuum desiccator. A yield of 13.5 g. (36%) of colorless solid is obtained.

EXAMPLE 25

5,6-Dichloro-1-β-diethylaminoethyl-3-ethyl-2-methyl-benzimidazolium chloride, hydrochloride

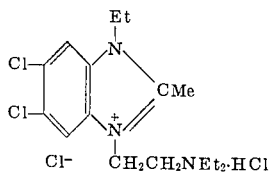

A mixture of 22.9 g. of 5,6-dichloro-1-ethyl-2-methyl-benzimidazole and 17.2 g. of β-diethylaminoethyl chloride, hydrochloride is heated at 165°–170° for 30 minutes. The mixture melted and then solidified. After cooling, the flask is broken from the cake and the cake ground in a mortar. The pulverized solid is refluxed with acetone and then cooled. The acetone is removed by filtration and this is repeated twice more. A yield of 31.7 g. (79%) of colorless quaternary salt is obtained, m.p. 224°–226° dec.

EXAMPLE 26

5,6-Dichloro-1-(3-dimethylaminopropyl)-3-ethyl-2-methyl-benzimidazolium chloride, hydrochloride

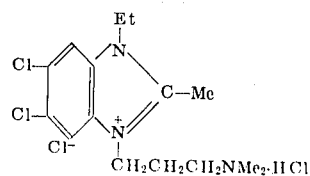

A mixture of 22.9 g. of 5,6-dichloro-1-ethyl-2-methyl-benzimidazole and 15.8 g. of 3-chloro-N,N-dimethyl-propylamine hydrochloride is heated at 170°–180° for 30 minutes. The mixture fused and then set to a glass on cooling. It is ground in a mortar and then stirred with 500 ml. of acetone for one hour. The solid is collected on a filter and then dried in a vacuum desiccator over potassium hydroxide. A yield of 37 g. (95%) of colorless hygroscopic solid is obtained.

EXAMPLE 27

5,6-Dichloro-1-[(2-dimethylamino-1-methyl)ethyl]-3-ethyl-2-methylbenzimidazolium chloride, hydrochloride

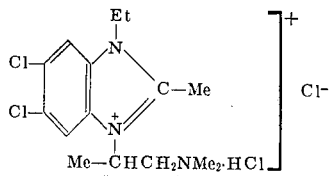

A mixture of 22.9 g. of 5,6-dichloro-1-ethyl-2-methyl-benzimidazole and 15.8 g. of 2-chloro-N,N-dimethyl-propylamine hydrochloride is heated at 170°–180° for 35 minutes. The mixture fused and then set to a glass on cooling. It is ground in a mortar and then dried in a vacuum desiccator. A yield of 31 g. (80%) of a very hygroscopic solid is obtained.

Merocyanine dyes of the invention are efficient spectral sensitizers for light sensitive silver halide, as shown in Table 1 below. The data in Table 1 was obtained by dissolving dyes in accordance with the invention in suitable solvents and adding the dissolved dye to separate portions of the light-sensitive photographic silver halide emulsions described below. The dyes are identified in Table 1 by reference to the above example numbers, and the concentrations employed are set out in the table. The photographic emulsions and the tests employed are described below:

Photographic Test A

The dyes are tested in a gelatin silver bromoiodide emulsion containing 0.77 mole percent iodide of the type described by Trivelli and Smith *Phot. Journal*, 79, 330 (1939). After digestion at 52° for 10 minutes, the emulsion samples are coated at a coverage of 432 mg. silver/ft.$^2$ on a cellulose acetate film support. A sample of each coating is exposed on an Eastman 1B sensitometer and to a wedge spectrograph, processed for 3 minutes at 20° C. in Kodak developer D–19, fixed, washed and dried.

Photographic Test B

All of the test conditions are the same as for A, with the exception that the emulsion is a gelatin silver chlorobromide emulsion containing 40 mole percent bromide.

Photographic Test C

The dyes are dissolved in suitable solvents and added to separate portions of a fine grain gelatin silver bromoiodide emulsion containing 2.5 mole percent iodide. After digestion at 40° for 10 minutes, the emulsion samples are coated on a cellulose acetate film support at 100 mg. silver/ft.$^2$. A sample of each coating is exposed on an Eastman 1B sensitometer and a wedge spectrograph, processed for 6 minutes at 20° C. in an Elon-hydroquinone developer, fixed, washed and dried.

Photographic Test D

All of the test conditions were as for C, except that the emulsion is a gelatin silver chlorobromoiodide emulsion containing 90 mole percent chloride, 9 mole percent bromide and 1 mole percent iodide, coated at 450 mg. silver/ft.$^2$ and developed for 4 minutes at 20° C. in Kodak developer D–19.

TABLE 1

| Dye of Example No. | Conc. mg/Ag mole | Emulsion type | Photographic test | Sens. max (nm.) | Sens. range (nm.) |
| --- | --- | --- | --- | --- | --- |
| 1 | 300.0 | BrI | C | 550 | 365-620 |
| 1 | 100.0 | ClBrI | D | 565 | 360-635 |
| 2 | 300.0 | BrI | C | 550 | 360-620 |
| 2 | 100.0 | ClBrI | D | 550 | 360-635 |
| 3 | 300.0 | BrI | C | 570 | 370-620 |
| 3 | 50.0 | ClBrI | D | 550 | to 620 |
| 4 | 300.0 | BrI | C | 575 | 375-615 |
| 5 | 300.0 | BrI | C | 570 | 375-620 |
| 6 | 100.0 | BrI | C | 640 | 525-690 |
| 7 | 300.0 | BrI | C | 595 | 365-630 |
|   | 150.0 |     | D | 485 | 350-540 |
| 8 | 300.0 | BrI | C | 575 | to 610 |
| 9 | 100.0 | BrI | C | 570 | 600 |
| 10 | 3.84 | ClBr | B | 565 | 645 |
|    | 2.56 | BrI | A | 575 | 630 |
| 11 | 2.56 | BrI | A | 575 | 645 |
|    | 4.16 | ClBr | B | 575 | 645 |
| 12 | 5.12 | ClBr | B | 500 | 600 |
| 13 | 2.88 | BrI | A | 575 | 645 |
|    | 4.80 | ClBr | B | 575 | 650 |
| 14 | 2.88 | BrI | A | 575 | 650 |
|    | 4.80 | ClBr | B | 575 | 650 |

The invention has been described in detail with particular reference to preferred embodiments thereof, but, it will be understood that variations and modifications can be effected within the spirit and scope of the invention.

We claim:

1. A light-sensitive photographic silver halide emulsion containing a merocyanine dye comprising first and second nuclei joined by a linkage selected from a double bond, a dimethine linkage, a tetramethine linkage and a hexamethine linkage; said first nucleus being selected from the group consisting of a rhodanine nucleus joined at the five- carbon atom thereof to said linkage and a 2-thiobarbituric acid joined at the five- carbon atom thereof to said linkage; and said second nucleus being a nitrogen-containing heterocyclic nucleus, the hetero-nitrogen atom of said nucleus having attached thereto a tertiary aminoalkyl group.

2. A light-sensitive photographic silver halide emulsion containing a merocyanine dye comprising first and second nuclei joined by a dimethine linkage, said first nucleus being selected from the group consisting of a rhodanine nucleus joined at the five-carbon atom thereof to said linkage, and a 2-thiobarbituric acid nucleus joined at the five-carbon atom thereof to said linkage; and, said second nucleus being a benzimidazole nucleus joined at the two-carbon atom thereof to said linkage, said benzimidazole nucleus having substituted on a heterocyclic nitrogen atom thereof a tertiary aminoalkyl group.

3. A light-sensitive photographic silver halide emulsion containing a merocyanine dye having the following formula:

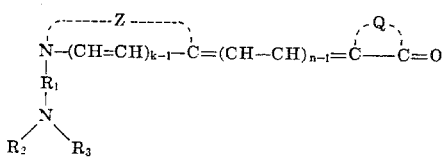

wherein $n$ represents an integer of from one to four; $k$ represents an integer of from one to two; Z represents the non-metallic atoms required to complete a five- to six-membered nitrogen-containing basic heterocyclic nucleus; $R_1$ represents an alkylene group containing from two to six carbon atoms; $R_2$ and $R_3$ taken separately represent a member selected from the group consisting of an alkyl group containing from two to 12 carbon atoms, an aryl group and, taken together, $R_2$ and $R_3$ represent the atoms required to complete, with the nitrogen atom to which they are attached, a heterocyclic nucleus containing four to five atoms; and Q represents the atoms required to complete a nucleus selected from the group consisting of a rhodanine nucleus and a 2-thiobarbituric acid nucleus, said nucleus being joined at the five-carbon atom thereof to the methine linkage of said dye.

4. A light sensitive photographic silver halide emulsion containing a merocyanine dye having the following formula:

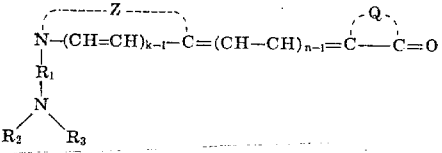

wherein $n$ represents two; $k$ represents one; Z represents the atoms required to complete a benzimidazole nucleus; Q represents the atoms required to complete a nucleus selected from the group consisting of a rhodanine nucleus and a 2-thiobarbituric acid nucleus, said nucleus being joined at the 5-carbon atom thereof to the methine linkage of said dye; $R_1$ represents an alkylene group containing from two to three carbon atoms; and, $R_2$ and $R_3$ each represents an alkyl group containing from one to four carbon atoms.

5. A light-sensitive photographic silver halide emulsion containing a merocyanine dye selected from the group consisting of 3-ethyl-5-{[1-ethyl-3-(2-morpholinoethyl)-2-benzimidazolinylidene]ethylidene}rhodanine; 3-ethyl-5-{[1-ethyl-5-methyl-3-(2-morpholinoethyl)-2-benzimidazolinylidene]-}-ethylidene}rhodanine; 5-{[5-chloro-1-ethyl-3-(2-morpholinoethyl)-2-benzimidazolinylidene]ethylidene}-3-ethylrhodanine; 5-{-[5,6-dichloro-1-ethyl-3-(2-piperidinoethyl)-2-benzimidazolinylidene]ethylidene}-3-ethylrhodanine; 5-{[5,6-dichloro-1-ethyl-3-(2-morpholinoethyl)-2-benzimidazolinylidene]ethylidene}-3-ethylrhodanine; 5-{4-[5,6-dichloro-1-ethyl-3-(2-morpholinoethyl)-2-benzimidazolinylidene]-2-butenylidene}-3-ethylrhodanine; 5-{[5,6-dichloro-1-ethyl-3-(2-morpholinoethyl)-2-benzimidazolinylidene]ethylidene}-1,3-diethyl-2-thiobarbituric acid; 5-[{5,6-dichloro-1-ethyl-3-[2-(1-pyrrolidinyl)ethyl]-2-benzimidazolinylidene}ethylidene]-3-ethylrhodanine; 5-{{5,6-dichloro-1-ethyl-3-[2-(3-pyrrolin-1-yl)ethyl]-2-benzimidazolinylidene]ethylidene}-3-ethylrhodanine; 5-{[5,6-dichloro-1-(2-dimethylaminoethyl)-3-ethyl-2-benzimidazolinylidene]ethylidene}-3-ethylrhodanine; 5-{[5,6-dichloro-1-(2-diethylaminoethyl)-3-ethyl-2-benzimidazolinylidene]ethylidene}-3-ethylrhodanine; 5-{[5,6-dichloro-1-(2-diethylaminoethyl)-3-ethyl-2-benzimidazolinylidene]-ethylidene}-1,3-diethyl-2-thiobarbituric acid; 5-{[5,6-dichloro-1-(3-dimethylaminopropyl)-3-ethyl-2-benzimidazolinylidene]ethylidene}-3-ethylrhodanine and 5-{[5,6-dichloro-1-[(2-dimethylamino-1-methyl)ethyl]-3-ethyl-2-benzimidazolinylidene]ethylidene}-3-ethylrhodanine.

6. A light-sensitive photographic silver halide emulsion containing a merocyanine dye 5-{[5,6-dichloro-1-(2-diethylaminoethyl)-3-ethyl-2-benzimidazolinylidene]-ethylidene}-3-ethylrhodanine.

* * * * *

UNITED STATES PATENT OFFICE
CERTIFICATE OF CORRECTION

Patent No. 3,655,393  Dated April 11, 1972

Inventor(s) Earl J. Van Lare, et al

It is certified that error appears in the above-identified patent and that said Letters Patent are hereby corrected as shown below:

On the cover sheet, under "References Cited UNITED STATES PATENTS", cancel "3,384,483" and insert -- 3,384,486 --. Column 16, line 6, after "taining" insert -- from -- ; line 35, cancel "lidene] - }ethylidene" and insert -- lidene]ethylidene -- ; line 37, delete "5-{-[5,6-" and insert -- 5-{[5,6- -- ; line 48, delete "benzimidazolinylidene]-ethylidene}-3-" and insert -- benzimidazolinylidene}ethylidene]-3- .

Signed and sealed this 14th day of November 1972.

(SEAL)
Attest:

EDWARD M. FLETCHER, JR.
Attesting Officer

ROBERT GOTTSCHALK
Commissioner of Patents